Sept. 22, 1964 H. E. METCALF 3,150,055
REACTOR
Filed Dec. 11, 1945 3 Sheets-Sheet 1
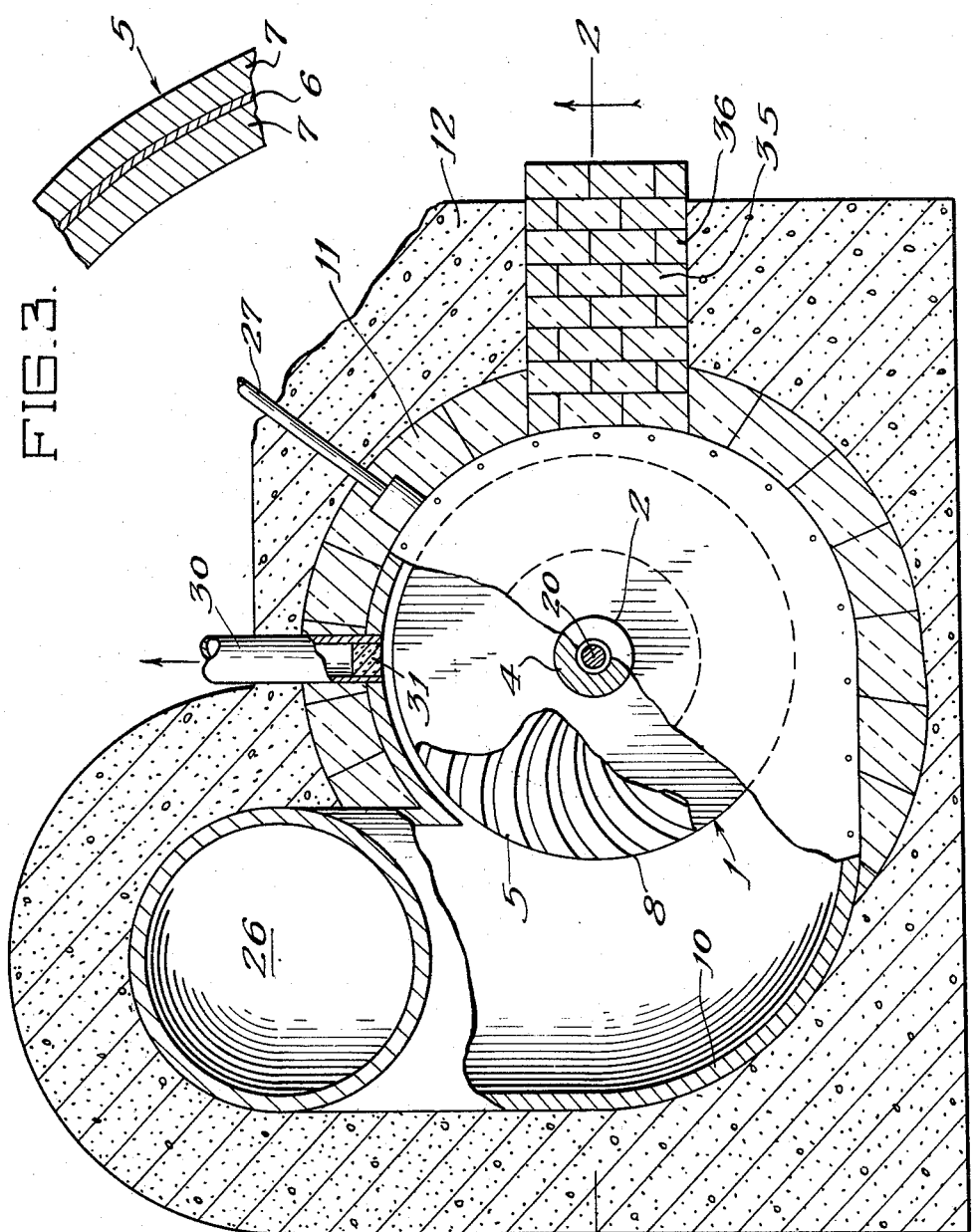
Witnesses:
Estill E. Ezell
Henry W. Johnson
Inventor:
Herbert E. Metcalf
By: Robert A. _____
Attorney

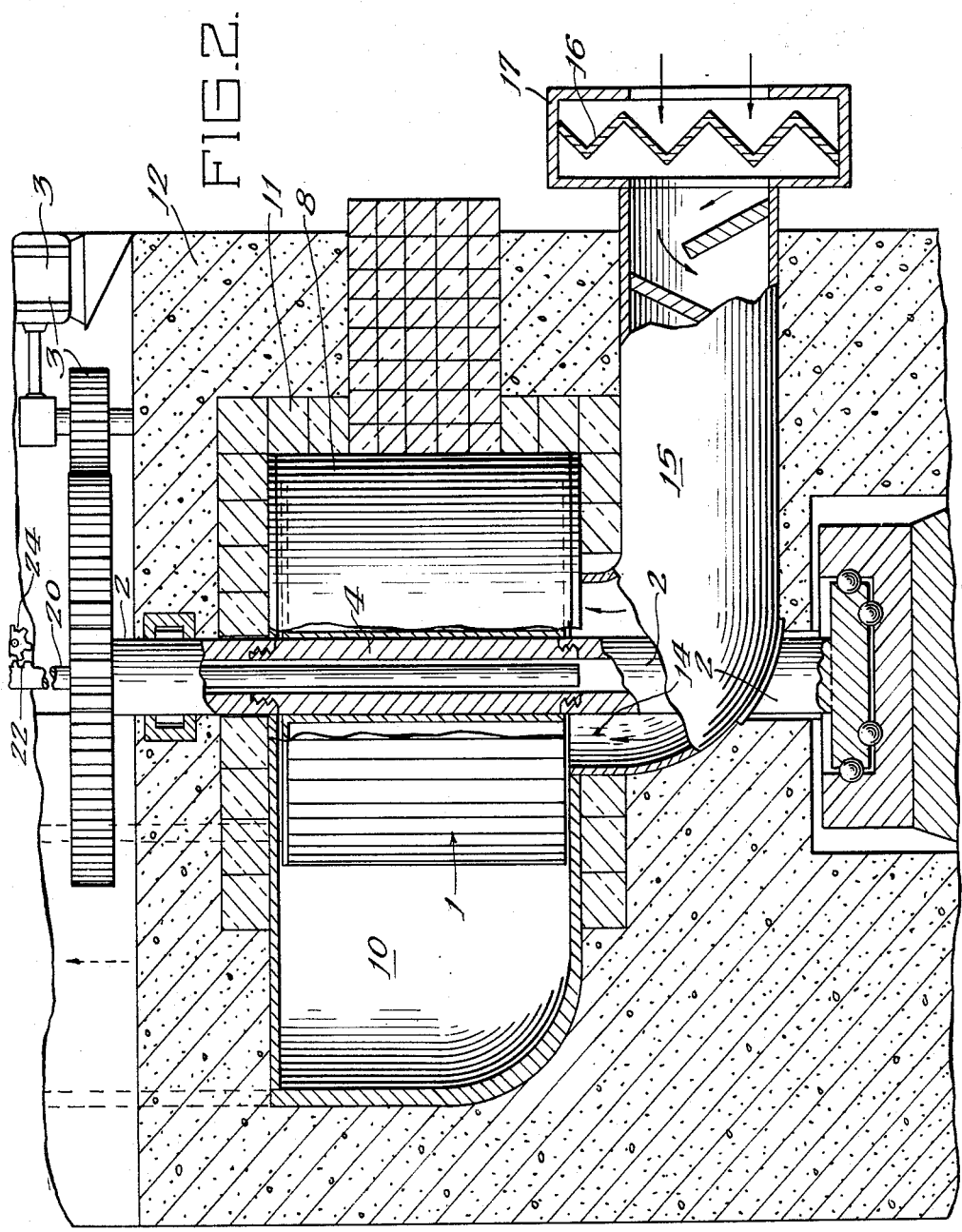

Sept. 22, 1964  H. E. METCALF  3,150,055
REACTOR
Filed Dec. 11, 1945  3 Sheets-Sheet 3

Witnesses:
Estill E. Ezell
Henry W. Johnson

Inventor:
Herbert E. Metcalf
By: Robert A. Carpenter
Attorney.

3,150,055
REACTOR

Herbert E. Metcalf, Chicago, Ill., assignor to the United States of America as represented by the United States Atomic Energy Commission
Filed Dec. 11, 1945, Ser. No. 634,318
4 Claims. (Cl. 176—61)

This invention relates to neutronic reactors and particularly to a self-cooled neutronic reactor for producing radiations for use in experimental work.

Heretofore, as described in the application of Fermi and Szilard, Serial No. 568,904, filed December 19, 1944 and the copending applications of Robert F. Christy, now Patent 2,708,656, dated May 17, 1955, Patent 2,843,543, dated July 15, 1958 and Patent 2,978,398, dated April 4, 1961, respectively, Serial No. 623,363, filed October 19, 1945, and Serial No. 631,408, filed November 28, 1945, small slow neutron neutronic reactors have been made using concentrated fissionable material in liquid moderators so balanced that a self-sustaining chain reaction is produced. The power developed is usually small, but due to their small size such reactors are efficient neutron generators because of high exterior neutron leakage. However, such liquid reactors usually are temperature sensitive, require a large amount of accessory equipment for cooling and control, and require precise and accurate installation and supervision to prevent leakage. These factors combine to make it difficult to maintain a constant power level.

It is one of the objects of the present invention to provide a relatively small and simple neutronic reactor which is self-contained, easily installed, cooled and operated, and safe for use by relatively inexperienced personnel.

Another object is to provide a simple neutronic reactor which is fluid cooled and easily controlled so that hazards due to failure of local water or power facilities and the like are eliminated.

Still another object of the invention is to provide a novel means and method of cooling a neutronic reactor.

In broad terms, the invention provides a rotatable neutronically reactive composition of sufficient mechanical stability and of such configuration that the rotating reactive composition itself can circulate coolant in adequate quantities to protect itself from overheating.

Other objects and advantages will become apparent from the following description wherein reference is made to the drawings in which:

FIG. 1 is a diagrammatic horizontal cross sectional view, partly in elevation, of one form of reactor embodying the principles of the present invention;

FIG. 2 is a vertical sectional view, partly in elevation, taken as indicated by line 2—2 of FIG. 1, part thereof being shown in elevation for clearness in illustration;

FIG. 3 is an enlarged fragmentary cross sectional view of one of the reactive blades of the reactive rotor shown in FIGS. 1 and 2.

Figure 4:
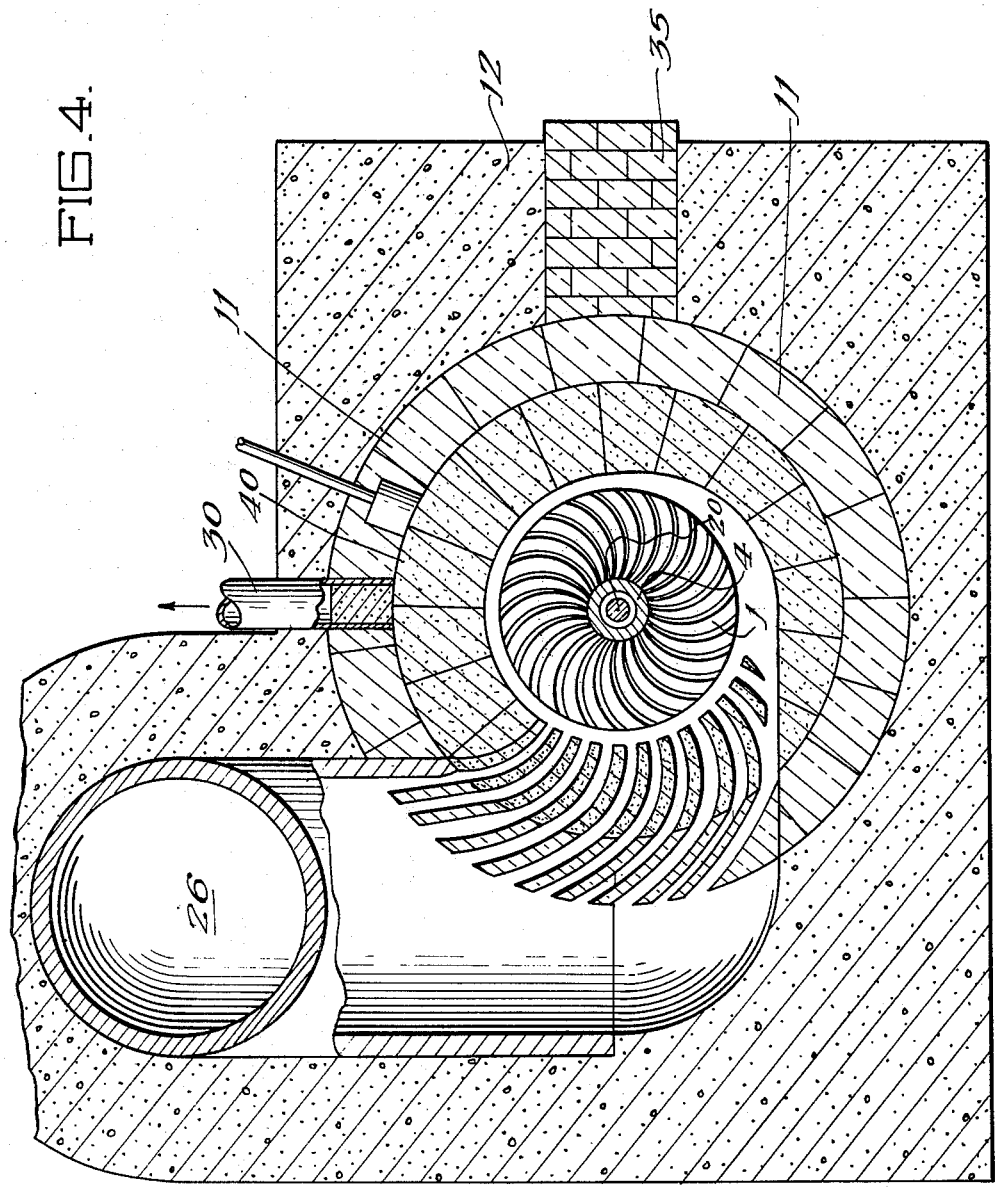
FIG. 4 is a diagrammatic sectional view similar to FIG. 1, illustrating a modified form of reactor.

Referring to FIGS. 1, 2, and 3, one form of reactor embodying the present invention grossly comprises a rotatable pump, preferably of the axial inlet and peripheral delivery type, having a rotor or rotary impeller 1 mounted preferably on a vertical shaft 2 which is rotated by a suitable motor and gears 3.

The rotor or impeller 1 comprises a hollow hub 4 and a plurality of generally radial blades 5 fastened integrally thereto. The blades 5 are spaced apart circumferentially and extend a divergent relation radially outwardly and are curved so as to present a convex face in the direction of rotation for drawing in air axially of the rotor and for discharging it at the periphery of the blades, as is well known in the blower art.

The impeller blades 5 are formed of a neutronically reactive composition. In the form shown for purposes of illustration in FIG. 3, the reactive composition is provided by forming the impeller blades of mostly neutron moderating material of adequate rigidity and formability, such as beryllium metal of high purity together with a fissionable material, such as a fissionable isotope of uranium ($U^{235}$) or plutonium ($94^{239}$) of high concentration. A preferred rotor has an integral hub and impeller blades, the impeller blades each comprising a thin central layer 6 of plutonium or $U^{235}$ sandwiched between thicker layers 7 of beryllium, which acts as an energy moderating material for the neutrons developed by fission. The hub may be made of beryllium metal, preferably enriched with the fissionable isotope. The rotor itself is made to be slightly over critical size, with about 30 percent air channel space. Exemplary sizes will be given later.

The reactive rotor thus formed is supported by a reactive backing plate 8 of beryllium and the fissionable isotope tying blades 5 together and is mounted on the shaft 2. No backing plate is used on the lower side of the rotor to provide for air inlet.

The rotor 1 is enclosed in a suitable volute casing 10, which may be of relatively thin and relatively non neutron absorbing metal, such as beryllium, backed at the ends and circumferentially, with a suitable neutron reflecting layer 11 of carbon, beryllium, water or heavy water, for example. A heavy neutron and gamma ray shield 12 of concrete, for example, surrounds the entire structure.

At the inlet end of the rotor 1, the reflector 11 and shield 12 are provided with an air inlet passage 14 to which air or other fluid coolant from the outside may flow through a suitable inlet conduit 15, having baffles of shielding material which define a serpentine path, so as to block direct radiations issuing from the passage 14. Cooling air is taken in through filters 16 in a shielded intake 17.

For controlling the power output of the reactor, and for shutting it down as desired or in event of failure of the motor 3, a control rod 20 of neutron absorbing material, such as cadmium is provided. Rod 20 is mounted on a suitable support for vertical movement into and out of the hollow hub 4 of the rotor, and is of proper size to stop completely the chain reaction when it is inserted a predetermined maximum distance into the hub of the rotor 1, in order to control the activity of the reactor within the range as determined by heat dissipation due to the coolant flow. The rod is provided with a rack 22 engaged by a pinion 24 which may be operated remotely. Preferably the pinion 24 is driven by a reversible electric control motor, not shown, operated from the usual commercial power lines and also so as not to be entirely dependent on commercial power, from a local power source. The control motor is preferably connected in a control circuit which controls the motor to insert the rod 20 and shut down the reactor in event of failure of the motor 3, or of too high neutron density being reached in the reactor. The rod also is controllable manually for adjusting the rod to different intermediate positions.

The heavy concrete shield 12, which extends entirely around the reactor, is continued upwardly at one portion to provide a discharge stack 26 connected to the outlet of the volute casing. A high stack is desirable because the cooling air becomes radioactive due to the formation of argon 41 gas in passing through the reactor. The radioactive air should be discharged at a high enough elevation to assure adequate dilution before it can reach any personnel.

For control and monitoring of the reactor, a suitable ionization chamber 27 is provided, positioned to receive neutrons from the chain reaction and may be connected in the control motor circuit, if desired, to control the rod 12 in response to the neutron density developed.

For laboratory use, it is desirable to have both fast neutrons and slow or thermal neutrons and gamma rays generated by operation of the reactor easily accessible. For fast neutron and gamma radiations a suitable radial passage 30 is provided in the shield 12 and extends therethrough and through the reflector terminating adjacent the reactive mass. Suitable filter plugs 31 of various materials may be used to seal the passage 30 and prevent escape of unwanted radiations and air radioactivity.

Circumferentially spaced from the passage 30 is a thermal neutron column 35 which extends through the reflector 11 and the shield 12 and is formed from neutron moderating material, such as graphite blocks 36. At the outer end of this thermal column of blocks 36, is a suitable laboratory space in which specimens may be irradiated by thermal neutrons issuing from the end of the column.

In operation, the rotor is rotated by motor 3 to start air flowing therethrough. Then the control rod 20 is withdrawn until a neutron reproduction ratio greater than unity is attained in the rotating composition. The neutron density then rises, and when a desired power is reached with the heat generated safely dissipated by the air flow, the control rod is inserted to the critical position where the neutron reproduction ratio is unity. Small movements of the rod thereafter serve to maintain the desired power.

While the reactor has been described as being wholly rotated, it is to be noted that in neutronic reactors the greatest temperature rise is at the center of the reactor. In consequence, and in some cases, all of the reactive composition need not be rotated. Some of the reactive composition can be disposed outside of the rotor, as shown in FIG. 4.

In this instance the rotor is made smaller, from one-half to two-thirds of the critical size, and a surrounding stationary layer 40 of Be+$U^{235}$ or 94, is placed outside of the rotating portion, this reactive layer in turn being surrounded by the reflecting layer 11. For symmetry of neutron density distribution, the outlet of the volute casing can be partially closed by a continuation of the reactive composition and reflecting layers if desired. In this manner the air flow occurs in the hottest portion of the reactor, and adequate cooling at low powers accomplished.

The size of the rotating, self-cooled reactors of the type described herein, will, of course, vary with the type of reactive composition utilized for the rotating mass.

For example, a slow neutron chain reaction will take place in a cylindrical rotor, where $U^{235}$ is the fissionable material and beryllium metal is the moderator, even without a reflector, having the following dimensions, with 30 percent voids.

Moderator: Beryllium Metal

Diameter and height _____ 101 centimeters.
Weight _____ 1170 kliograms.
Amount of $U^{235}$ or 94 _____ 23.4 kilograms.

Weight and size can be reduced by reducing the amount of moderator present, and operating the reaction with neutrons of higher than thermal energies.

Consequently, a reactor approaching the minimum size will be obtained without moderator, utilizing a controllable fast neutron fission reaction. The dimensions of such a reactor using plutonium ($94^{239}$) when 50 percent voids are present are as follows:

Moderator _____ None.
Diameter and height _____ 15.2 centimeters.
Volume (including voids) _____ 2,750 cubic centimeters.
Weight of $94^{239}$ _____ 25.1 kilograms.

In the latter case, the plutonium is protected from oxidation and from delivering fission products into the air stream, by a layer of ¼ millimeter aluminum over the plutonium in the vanes.

When efficient reflectors are used, the above stated sizes are reduced a few centimeters. Obviously, therefore, there is a wide choice of sizes available, by the choice of the proper reactive composition.

While the present invention has been described as circulating a gas for cooling purposes it should be pointed out that a liquid can also be circulated by the rotating mass, if desired. In case the liquid used is also a neutron moderator, such as $H_2O$ or $D_2O$, then no moderator need be included in the vanes, which can then be $U^{235}$ or $94^{239}$ protected by an aluminum sheath, as in the fast neutron reactor described above. The reaction then becomes a slow neutron reaction, with only a small increase in size, with $H_2O$, to allow for neutron absorption therein. As the neutron absorption in $D_2O$ is negligible, no significant increase in size will be required for operation as a slow neutron device. Other modifications will be apparent to those skilled in the art, within the scope of the appended claims.

The power developed by the reactor such as described herein will, of course, depend on the air flow developed by rotation of the reactor. Powers up to several kilowatts can be safely attained, and at these powers, large quantities of fast and slow neutrons and gamma rays are made available for use outside the reactor.

It is apparent from the foregoing that a small, compact, simple, easily controlled and relatively inexpensive self-cooled neutronic reactor has been provided.

Having thus described the invention,
What is claimed is:

1. A neutronic reactor comprising, in combination, a rotor consisting of a hollow hub of beryllium and a plurality of generally radial blades fastened integrally thereto, said blades being formed of a thin central layer of a material fissionable by neutrons of thermal energy sandwiched between thicker layers of beryllium, said rotor consisting of approximately 30% void space with the ratio of beryllium to fissionable material therein being such that the reactor operates predominantly on neutrons of thermal energy, a volute casing of beryllium having an inlet and an outlet for air enclosing the rotor, means for rotating the rotor, and a control rod for thermal neutron absorbing material mounted for movement axially of the rotor in the hollow hub.

2. The combination according to claim 1 in which a reflector is disposed about the casing.

3. The combination according to claim 1 in which the rotor is 101 centimeters in diameter and height and contains approximately 1170 kilograms of beryllium and approximately 23.4 kilograms of fissionable material.

4. A neutronic reactor comprising, in combination, a rotor consisting of a hollow hub of beryllium and a plurality of generally radial blades fastened integrally thereto, said blades being formed of a thin central layer of a material fissionable by neutrons of thermal energy sandwiched between thicker layers of beryllium, a zone disposed about said rotor containing beryllium and material fissionable by neutrons of thermal energy, the ratio of beryllium to fissionable material in the reactor being such that the reactor operates predominantly on neutrons of thermal energy, a neutron reflector disposed about the said zone, a radiation shield disposed about said reflector, an inlet and an outlet for air to the rotor, means for rotating the rotor, and a control rod of a thermal neutron absorbing material mounted for movement axially of the rotor in the hollow hub.

References Cited in the file of this patent

UNITED STATES PATENTS

| | | |
|---|---|---|
| 820,656 | DeMare | May 15, 1906 |
| 2,206,634 | Fermi et al. | July 2, 1940 |

FOREIGN PATENTS

| | | |
|---|---|---|
| 129,873 | Great Britain | July 24, 1919 |
| 114,150 | Australia | May 2, 1940 |
| 114,151 | Australia | May 3, 1940 |
| 233,011 | Switzerland | Oct. 2, 1944 |

OTHER REFERENCES

Goodman: "The Science and Engineering of Nuclear Power," vol. 1, page 275, Addison-Wesley (1947).

Kelly et al.: Phy. Rev. 73, 1135-9 (1948).

Glasstone: "Principles of Nuclear Reactor Engineering," July 1955, page 320, D. Van Nostrand Co., Inc.

Smyth: "Atomic Energy" 1945, pages 57-58, Princeton University Press.